US008531582B2

(12) United States Patent
Izumi et al.

(10) Patent No.: US 8,531,582 B2
(45) Date of Patent: Sep. 10, 2013

(54) IMAGING APPARATUS AND METHOD FOR CONTROLLING IMAGING APPARATUS (75) Inventors: Mitsuhiro Izumi, Yokohama (JP); Ryo Yamasaki, Tokyo (JP); Makoto Oikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 188 days.

(21) Appl. No.: 12/903,674

(22) Filed: Oct. 13, 2010

(65) Prior Publication Data

US 2011/0096207 A1  Apr. 28, 2011

(30) Foreign Application Priority Data

Oct. 22, 2009  (JP) ................. 2009-243041

(51) Int. Cl.
*H04N 5/225* (2006.01)
*H04N 5/228* (2006.01)
*G02B 27/14* (2006.01)

(52) U.S. Cl.
USPC ........................ 348/341; 348/222.1; 359/629

(58) Field of Classification Search
USPC .............. 348/335, 341–347, 222.1; 359/629, 359/631, 634
See application file for complete search history.

(56) References Cited

U.S. PATENT DOCUMENTS

| 2006/0066957 | A1* | 3/2006 | Fukui ........................... 359/689 |
| 2006/0203350 | A1* | 9/2006 | Nakano et al. ................ 359/629 |
| 2008/0291447 | A1* | 11/2008 | Vakrat et al. .................. 356/364 |
| 2009/0262236 | A1* | 10/2009 | Kashiki et al. ................ 348/347 |

FOREIGN PATENT DOCUMENTS

| JP | 09-159807 | 6/1997 |
| JP | 2000-020691 | 1/2000 |
| JP | 2007-329852 | 12/2007 |

* cited by examiner

*Primary Examiner* — Kelly L Jerabek
(74) *Attorney, Agent, or Firm* — Cowan, Liebowitz & Latman, P.C.

(57) ABSTRACT

Light transmitted through the imaging lens 100 is divided into two light fluxes by the half mirror 202 fixed in the camera body 200, and two light fluxes are guided to the imaging element 201 and optical viewfinder, respectively. An image processing unit corrects aberration, which occurs due to the transmittance of light through the half mirror 202, of the image data generated after receiving light at the imaging element 201, by conversion processing based on a transfer function representing its optical transfer characteristics and restores the image data prior to the occurrence of aberration.

6 Claims, 9 Drawing Sheets

IMAGING APPARATUS AND METHOD FOR CONTROLLING IMAGING APPARATUS

BACKGROUND OF THE INVENTION

1. Field of the Invention

The present invention relates to an imaging apparatus including an optical viewfinder and a half mirror.

2. Description of the Related Art

When a user or photographer performs moving image shooting while looking through an optical viewfinder, light flux incident from an imaging lens needs to be divided into the light flux directed towards the optical viewfinder and the light flux directed towards the imaging surface. In a single-lens reflex digital camera, the structure is generally configured such that a half mirror performs optical path division/splitting to thereby direct light transmitted through the half mirror towards the imaging surface. However, in this case, optical aberration occurs on the photographing plane due to the transmission of light through the half mirror, and degradation of image quality is a concern. On the other hand, the occurrence of aberration is suppressed for the light flux reflected from the half mirror. By utilizing this phenomenon, a camera having a structure in which light reflected from the half mirror is directed towards the imaging surface has been proposed in Japanese Patent Laid-Open No. 2007-329852. In addition, a method for optically correcting aberration by changing the thickness of the half mirror depending on the image height has also been proposed in Japanese Patent Laid-Open No. 9-159807. A structure in which the effect of aberration is drastically reduced by using a thin film material such as a pellicle or the like as a half mirror or a structure in which the occurrence of aberration is also suppressed in a beam splitter having a reflection surface formed on a prism have been proposed.

In addition, as an example of the restoration of a degraded image (for example, blurred images or out-of-focused images), Japanese Patent Laid-Open No. 2000-20691 discloses an image processing apparatus that generates a degradation function based on the property information of the imaging apparatus and the like to thereby generate a restored image by the image subjected to reconversion based on the degradation function.

SUMMARY OF THE INVENTION

However, in the prior art, effective countermeasures for realizing a small-sized and low-cost camera while suppressing aberration have not sufficiently taken. For example, in the camera disclosed in Japanese Patent Laid-Open No. 2007-329852, the imaging surface is disposed at a position to be reached the light transmitted through the imaging lens and reflected from the half mirror, whereby it is difficult to reduce in size due to the layout of the camera. Also, in the camera disclosed in Japanese Patent Laid-Open No. 9-159807, the half mirror needs to be subjected to special processing, resulting in an expensive camera. Furthermore, the effect of corrections may change depending on the conditions of the imaging lens, such as the F number or the like, and degradation of image quality cannot be avoided. When a pellicle is used, the handling thereof is difficult due to the thin film form of the pellicle. Additionally, since a prism is expensive and heavy, it cannot be easily applied to a small-sized and low-cost camera.

Accordingly, the present invention provides an imaging apparatus including an optical viewfinder and a half mirror such that a small-sized and low-cost imaging apparatus is realized while suppressing aberration caused by the half mirror.

In view of the foregoing, according to an aspect of the present invention, an imaging apparatus is provided that includes an optical element that is obliquely disposed relative to the optical axis of an imaging lens in order to reflect and transmit a part of light transmitted through the imaging lens; an optical viewfinder that is capable of observing a subject with light reflected from the optical element; an imaging element that receives light transmitted through the optical element to output image data; and an image processing unit configured to correct aberration, which occurs due to the transmittance of light through the optical element with respect to the image data obtained by the imaging element, by conversion processing based on a transfer function according to the optical element and restore the image to the one prior to the occurrence of aberration.

According to the present invention, reduction in size and cost can be realized for the imaging apparatus including an optical viewfinder while suppressing aberration caused by the optical element.

Further features of the present invention will become apparent from the following description of exemplary embodiments with reference to the attached drawings.

DESCRIPTION OF THE EMBODIMENTS

First Embodiment

Figure 1:
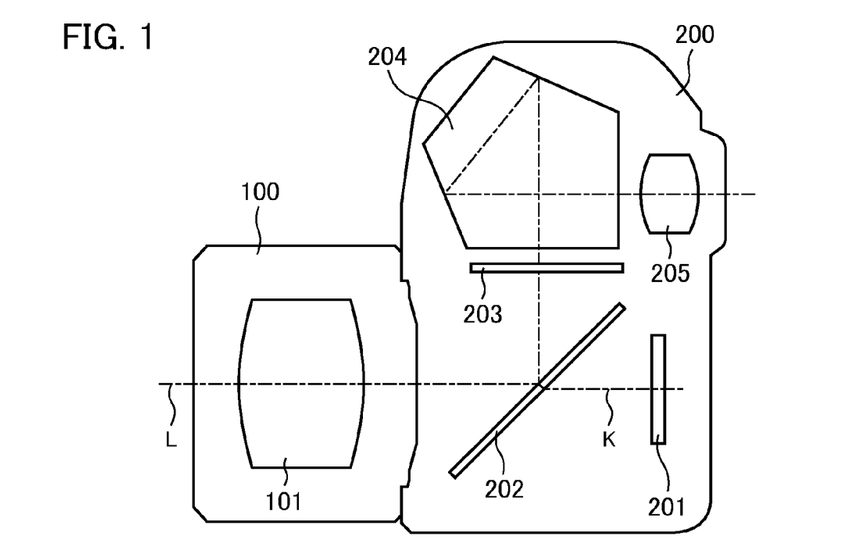
FIG. 1 is a schematic diagram illustrating the central section of a single-lens reflex camera in order to explain a first embodiment of the present invention in conjunction with FIGS. 2 to 10.

Hereinafter, a description will be given as to how a first embodiment of the present invention is applied to a single-lens reflex type digital camera consisting of an interchangeable lens system. FIG. 1 is a schematic diagram illustrating the central vertical-section of the optical system of the single-lens reflex camera.

In FIG. 1, an imaging lens 100 is interchangeably mounted on a camera body 200, and the lens section 101 provided in the imaging lens 100 includes a focus lens group and a zoom lens group. The character "L" in FIG. 1 represents the optical axis of the imaging lens 100.

In the camera body 200, an imaging element 201 is disposed near the predetermined imaging plane of the imaging lens 100. The imaging element 201 is an imaging unit including a photoelectric conversion element such as an optical low pass filter, an infrared cut filter, a CMOS sensor, or the like. Between the imaging lens 100 and the imaging element 201, a half mirror 202 is obliquely disposed relative to the optical axis L. The half mirror 202 is an optical element that is formed of a parallel flat glass plate or the like. For the half mirror 202, a mirror having a function of an optical path branching/splitting means and semi-transparency for the entire surface is employed. Light flux transmitted through the imaging lens 100 is separated into a reflected light that is guided to an optical viewfinder above in FIG. 1 and a transmitted light that is incident on the imaging element 201. A focus plate 203, a pentaprism 204, and an eyepiece optical system 205 shown in FIG. 1 constitute the optical viewfinder. Reflected light reflected on the half mirror 202 is focused on the matt surface of the focus plate 203, including the matt surface and a Fresnel surface, and is guided to the eye of a photographer via the pentaprism 204 and the eyepiece optical system 205. On the other hand, transmitted light transmitted on the half mirror 202 is received by the imaging element 201. The received light intensity signal is converted into an electronic image through an A/D conversion section or an image processing section (neither of which are shown) to thereby perform image displaying and data recording. Note that the optical axis relating to the transmitted light passing through the half mirror 202 is the optical axis K that is offset toward the downward direction shown in FIG. 1 by refraction through the half mirror 202. Hence, the imaging element 201 is disposed such that the center of the imaging surface of the imaging element 201 coincides with the optical axis K.

However, in general, when a flat-plate like optical element such as a glass plate or the like is obliquely disposed between the imaging lens and the imaging element, an increased aberration may occur in an image obtained by the imaging element. This is because the light beams transmitted through the lens have different positions in the optical path length direction that passes through the optical element passes and the magnitude of aberration also differs depending on their positions. Accordingly, in the conventional single-lens reflex camera, the half mirror has generally been retracted toward the outside of the imaging light flux by the quick return mechanism during imaging.

In contrast, in the present embodiment, the half mirror 202 is obliquely fixed to the main body, and the light flux transmitted through the half mirror 202 is employed during imaging to carry out shooting. Although aberration may occur in the image obtained by the imaging element 201, this is different from the optical aberration of the imaging lens 100, resulting in a non-axisymmetric aberration. In the present embodiment, the asymmetrical aberration is corrected by an image processing circuit (see the reference number 413 in FIG. 5) to be described below to thereby form a favorable electronic image with no aberration. The details of processing will be described below.

As described above, the imaging apparatus shown in FIG. 1 is configured so that shooting using the imaging element 201 and observation of a subject through the optical viewfinder can be performed. Hence, the optical viewfinder can be utilized during motion picture imaging. Consequently, the subject moving quickly can be followed, which is impossible by using an electronic viewfinder or the like. In addition, since the half mirror 202 is fixed to the main body, unlike the conventional single-lens reflex camera, it is not necessary to use the quick return mechanism by which the half mirror is retracted toward the outside of the imaging light flux during imaging. Thus, the imaging apparatus of the present invention is suitable for its structural simplicity, lower cost, and its compactness.

Figure 2A:
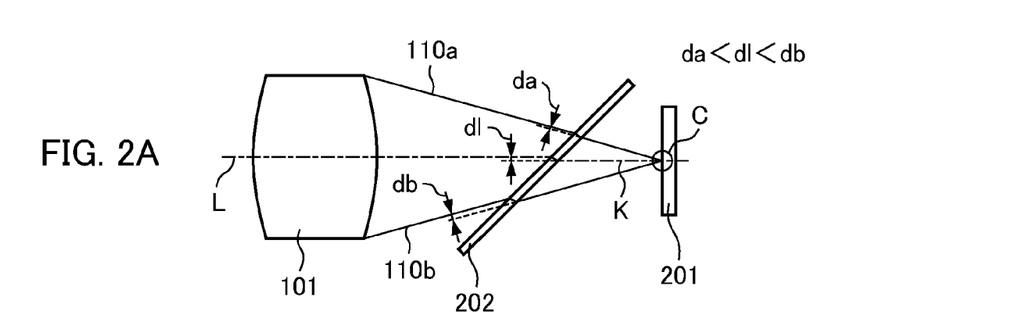
FIG. 2A is a diagram illustrating aberration caused by a half mirror.

FIG. 2A is a diagram illustrating aberration caused by the half mirror 202 and shows only an extracted part in FIG. 1 that is required for explanation. Among the light fluxes that are emitted from a single point on the optical axis L from the object side and pass through the lens section 101 to thereby image near the center image height of the imaging element 201, only the outermost light beams, i.e., light beams 110a and 110b are shown. Note that the light beam(s) on the object side across the lens section 101 is not shown. Each of the light beams 110a and 110b is refracted on the incident surface of the half mirror 202 at an angle given by Snell's law and travels straight through the half mirror 202. Then, each of the light beams 110a and 110b is again refracted on the exit surface of the half mirror 202 at an angle given by Snell's law, and exits therefrom. At this time, the angle of the light beam that is incident to the half mirror 202 is equal to the angle of the exit light beam. As is known in the art, this is because of the principle of the refraction of light through the parallel flat plate, and the principle similarly applies to light along the optical axis L. Specifically, the angle of the light beams transmitted through the half mirror 202 does not change, but only a parallel shift occurs.

Figure 3:
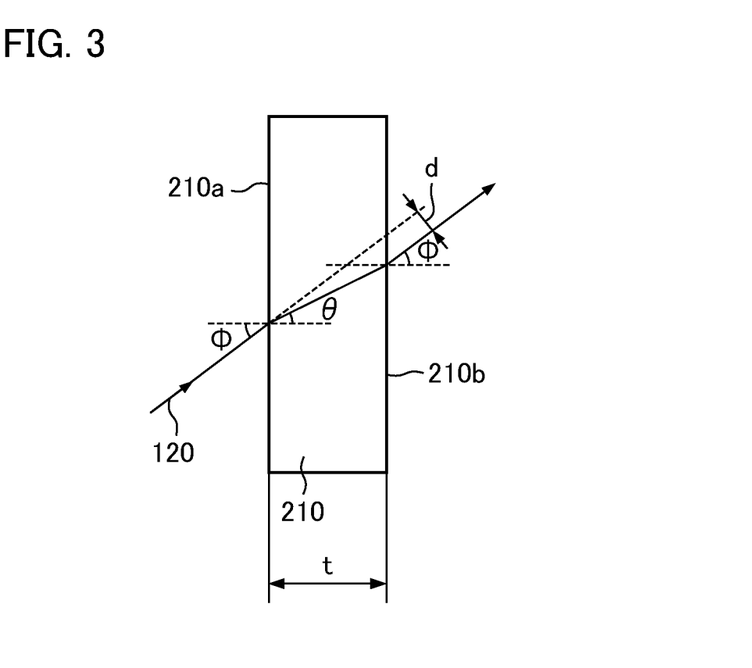
FIG. 3 is a diagram illustrating the refraction of light through a parallel flat plate.

FIG. 3 is a diagram for illustrating in detail the refraction of the light beam, and shows the refraction of light passing through a parallel flat plate 210 in air. A light beam 120 is indicated by an arrow which is incident to the parallel flat plate 210. When the light beam 120 is incident to the incident surface 210a of the parallel flat plate 210 with an incident angle $\phi$, the light beam 120 is refracted at an angle given by Snell's law. The refracted light travels straight through the parallel flat plate 210 with the angle $\theta$, and then is again refracted on the exit surface 210b of the parallel flat plate 210 to thereby exit with an angle $\phi$, which is equal to the incident angle $\phi$. An outgoing light beam is displaced in parallel from an entering light beam with the shift amount (hereinafter referred to as "parallel shift amount") indicated by d. Here, given that the plate thickness of the parallel flat plate 210 is denoted by t, the refractive index of air is denoted by n0, and the refractive index of the parallel flat plate 210 is denoted by n1, the parallel shift amount d is represented by the following formula (1).

[Formula 1]

$$d = t \cdot \sin\Phi \cdot \left(1 - \frac{n0 \cdot \cos\Phi}{n1 \cdot \cos\theta}\right) \tag{1}$$

From the above formula (1), it can be seen that the greater the incident angle $\phi$, the greater the parallel shift amount d. Accordingly, when the parallel shift amounts of the light beam 110a, the optical axis L, and the light beam 110b, all of which are shown in FIG. 2A, are denoted by da, dl, and db, respectively, the three parallel shift amounts are in the relationship "da<dl<db". This is because the light beam 110a, the light beam along the optical axis L, and the light beam 110b have different incident angles on the half mirror 202, and are in a relationship in which the incident angle of the optical axis L is greater than that of the light beam 110a and the incident angle of the light beam 110b is greater than that of the optical axis L. For this reason, the position at which the light beam 110a intersects the optical axis K does not coincide with the position at which the light beam 110b intersects the optical axis K due to the parallel shift, whereby the light beam 110b intersects the optical axis K more on the right side than the light beam 110a in FIG. 2. This results in aberration caused by the half mirror 202.

Figure 2B:
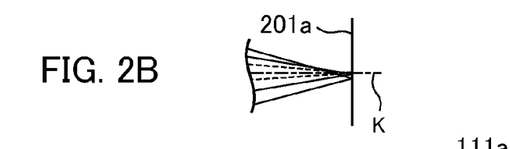
FIG. 2B is a diagram illustrating aberration caused by a half mirror.

While a description has been made using only two light beams in FIG. 2A, an actual image is formed by a number of light beams, whereby the positions at which the light beams intersect each other on the optical axis K do not coincide with the cross section shown in FIG. 2. FIG. 2B is an enlarged view showing the area near the center image height C of the imaging element 201 shown in FIG. 2A, and shows the light beams to be imaged on the imaging surface. The line indicated by the reference number 201a represents the vicinity of the light receiving plane of the imaging element 201, i.e., the predetermined imaging plane of the imaging lens 100, on which a number of light beams are concentrated. However, the positions at which all of the light beams intersect each other on the optical axis K are different due to the influence of the parallel shift caused by the half mirror 202 described in FIG. 2A, resulting in a non-ideal imaging state. Note that since the actual light beams are also present in a direction perpendicular to the plane of the sheet shown in FIG. 2, a more complex aberration distribution is exhibited. However, since the half mirror 202 is obliquely disposed with respect to the optical axis L only within the plane of the sheet in FIG. 1, the aberration distribution has a symmetry in a direction perpendicular to the plane of the sheet shown in FIG. 2. Also, as can be seen from the formula (1), the aberration may differ/vary depending on the refractive index of the parallel flat plate 210, i.e., the half mirror 202. Hence, the aberration may also differ depending on the wavelength. Furthermore, since the angle of the incident light beam may differ depending on the image height, the aberration may also differ depending on the image height.

Figure 2C:
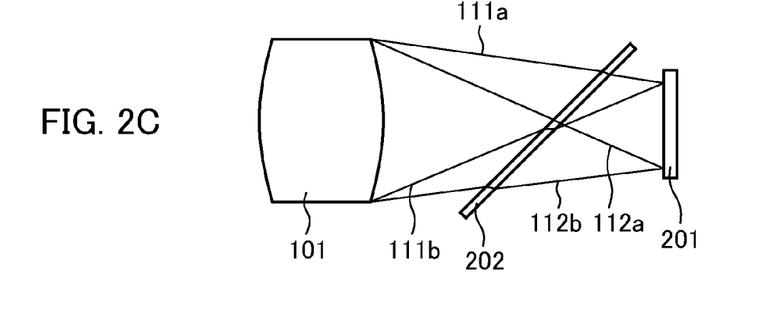
FIG. 2C is a diagram illustrating aberration caused by a half mirror.

FIG. 2C is a diagram for illustrating the aberration of the light beam reaching the peripheral image height. Each of light beams 111a and 111b represents a light beam focusing at the upper image height of the imaging element 201, and each of the light beam 112a and 112b represents a light beam focusing at the lower image height of the imaging element 201. Since the light beams have different incident angles through the half mirror 202, the parallel shift amounts thereof also differ from the principle described in FIG. 3. Consequently, the aberration between the light beams 111a and 111b is different from that between the light beams 112a and 112b. In addition, the parallel shift amount of the light beams focusing at the upper image height and the lower image height is different from that of the light beams focusing near the center image height of the imaging element 201 described in FIG. 2B, resulting in an asymmetrical aberration in the vertical direction of the imaging element 201 shown in FIG. 2C. Note that in the direction perpendicular to the plane of the sheet shown in FIG. 2C, the aberration has a symmetry even for the peripheral image height for reasons described above. At the peripheral image height, the state of aberration may differ depending on the wavelength. Note that the detailed state of the actual aberration can be observed by calculating a spot diagram, an MTF (Modulation Transfer Function), and the like using well-known optical simulation software or the like.

As described above, in the image obtained by the light flux transmitted through the half mirror 202, the following aberration occurs.

(A) Aberration that is symmetrical in the direction perpendicular to the plane of the sheet/page shown in FIG. 2, i.e., the first axial direction extending parallel to the surface of the half mirror 202 orthogonal to the optical axis L and is asymmetrical in the second axial direction (the vertical direction in FIG. 2) orthogonal to the first axial direction.

(B) Aberration that differs depending on the image height and the wavelength.

Hence, according to the present invention, the aberration is removed by an image processing circuit 413 to thereby form an image that is free from deterioration caused by aberration. Hereinafter, the basic concept of a method for restoring an image to the one prior to the occurrence of aberration will now be described.

Figure 4:
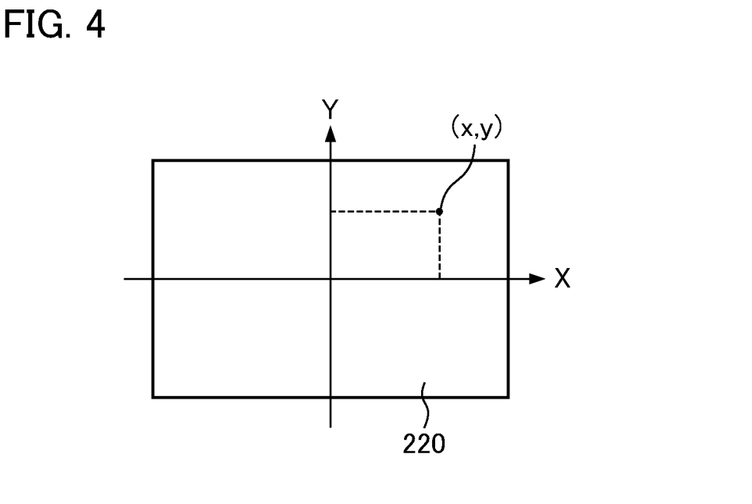
FIG. 4 is a diagram illustrating a imaging range of an imaging element.

FIG. 4 shows an imaging range 220 of the imaging element 201. By the imaging range 220, the two-dimensional orthogonal coordinate system (see the horizontal axis X and the vertical axis Y) in which the origin is the center thereof is defined. Any coordinate point within the imaging range 220 is denoted by (x, y), and the light quantity distribution of an image prior to deterioration caused by the aberration between the imaging lens 100 and the half mirror 202 in the coordinate point is denoted by the function o (x, y). When the light quantity distribution of a degraded image caused by the aberration between the imaging lens 100 and the half mirror 202 is denoted by the function i (x, y), the function i (x, y) can be represented by the following formula (2).

[Formula 2]

$$i(x,y)=\iint o(x-a,y-b) \cdot h(x,y) da db \qquad (2)$$

Here, the function h (x, y) is a transfer function representing how an image is degraded by the imaging lens 100 and the half mirror 202. Also, the above formula (2) is a degraded image model formula including the aberration caused by the half mirror 202 as well as the aberration caused by the imaging lens 100.

The above formula (2) is a formula by which the function i (x, y) is calculated by the convolution integration of the functions o (x, y) and h (x, y). Hence, when a Fourier transform is applied to the formula (2), the formula (2) can be represented in the form of a functional product after a transformation to thereby obtain the following formula (3).

[Formula 3]

$$I(u,v)=O(u,v) \cdot H(u,v) \qquad (3)$$

Here, the functions I (u, v), O (u, v), and H (u, v) are the two dimensional Fourier transformed functions of i (x, y), o (x, y), and h (x, y), respectively, and each of the variables u and v represents a spatial frequency. Hence, when the above formula (3) is transformed, the function o (u, v) prior to deterioration can be represented by the following formula (4), and the image data prior to degradation, i.e., prior to the occurrence of aberration is determined by the inverse Fourier transform.

[Formula 4]

$$O(u, v) = I(u, v) \cdot \frac{1}{H(u, v)} \quad (4)$$

In the above formula (4), the term "1/H(u, v)" is generally referred to as an "inverse filter". Data on the filter is stored in a nonvolatile memory 431 (see FIG. 5) or the like in advance, so that an image can be restored to the one prior to degradation caused by the aberration of the half mirror 202. Note that in the actual image restoration process, an image may be affected by noise or the like. Hence, not only the inverse filter but also a method using a known Wiener filter, a linear iterative modification method, a non-linear iterative modification method, or the like may be employed. Also, as is described in (A), the aberration resulting from the half mirror 202 has a left-right symmetry along the Y axis in FIG. 4, data on a filter for restoration may be prepared for only half of the imaging range 220. For example, based on filter processing data according to a first-quadrant and a fourth-quadrant shown in FIG. 4, an image restoration process can be performed for a second-quadrant and a third-quadrant utilizing the symmetry of the first- and fourth-quadrants. Furthermore, by means of filter processing, a degraded image, which is caused not only by the aberration of the half mirror 202 but also by the aberration of the imaging lens 100, can be enhanced or restored.

By executing the aforementioned processing, the image processing circuit 413 enhances the degraded image to the one without the aberration of the half mirror 202. Note that since the aberration resulting from the half mirror 202 may differ depending on the wavelength, the actual image restoration performed by the image processing circuit 413 is performed by using image data that has been acquired for the respective colors: R (Red), G (Green), and B (Blue), the details of which will be described below.

Figure 5:
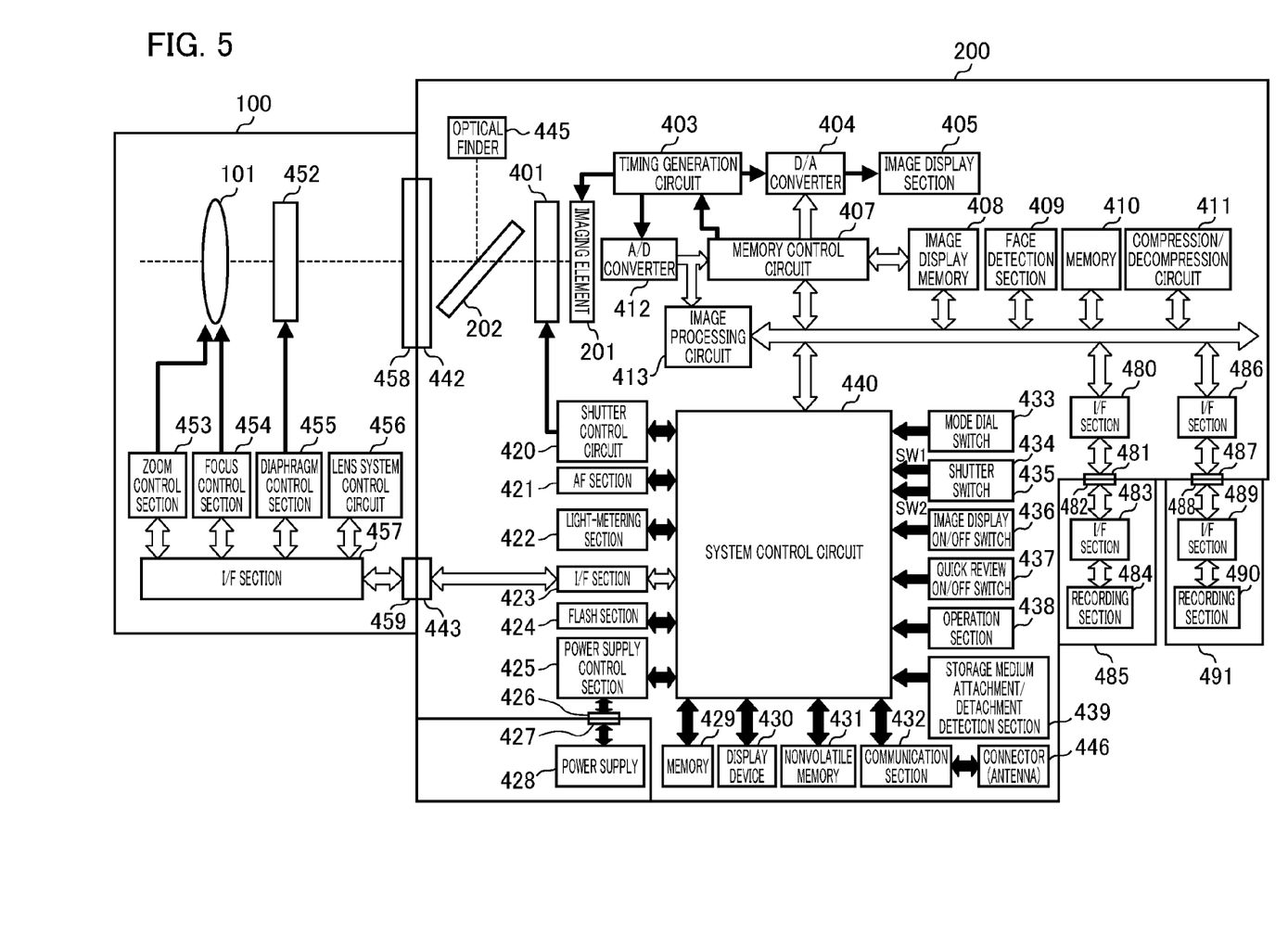
FIG. 5 is a block diagram illustrating an exemplary electrical configuration of an imaging apparatus.

FIG. 5 is a block diagram illustrating an example of the configuration of an imaging apparatus. The imaging apparatus is constituted by the camera body 200, and the imaging lens 100 that is interchangeably mounted on the camera body 200.

First, the camera body 200 will be described. A shutter 401 controls an exposure amount, and the imaging element 201 provided behind the shutter 401 converts an optical image into an electrical signal (image signal). An analog-to-digital (A/D) converter 412 converts an analog image signal from the imaging element 201 into a digital signal (image data). A timing generation circuit 403 is a circuit that supplies a clock signal or a control signal to the imaging element 201, the A/D converter 412, and a digital-to-analog (D/A) converter 404, and is controlled by a memory control circuit 407 and a system control circuit 440. The image processing circuit 413 performs pixel interpolation processing, color conversion processing, and the like with respect to image data from the A/D converter 412 or image data from the memory control circuit 407. The image processing circuit 413 can also perform arithmetic processing using image data, such as the aberration correction processing to be described below. Based on the obtained arithmetic result, the system control circuit 440 performs auto focus (AF) processing, automatic exposure (AE) processing, and the like with respect to a focus control section 454 and a diaphragm control section 455 of the imaging lens 100 to be described below. Furthermore, the image processing circuit 413 also performs through-the-lens (TTL) type auto white balance (AWB) processing based on the obtained arithmetic result. A face detection section 409 detects the face area of a person, i.e., a subject as an image to be detected.

The memory control circuit 407 controls the A/D converter 412, the timing generation circuit 403, the image processing circuit 413, an image display memory 408, the D/A converter 404, the face detection section 409, a memory 410, and a compression/decompression circuit 411. The output data from the A/D converter 412 is written in the image display memory 408 or the memory 410 via the image processing circuit 413 and the memory control circuit 407 or directly via the memory control circuit 407. As the image display section 405, a liquid crystal display device or the like is employed. The image data written in the image display memory 408 is transmitted to the image display section 405 via the D/A converter 404 for displaying the image data as an image. The captured image data is successively displayed on the image display section 405, whereby an electronic view finder function can be realized. The image display section 405 can control the ON/OFF state of displaying in accordance with the instructions provided by a system control circuit 440, so that power consumption of the camera body 200 can be saved in the OFF state.

The memory 410 stores data of the captured still images or moving images, and has a sufficient storage capacity for recording a predetermined number of the still pictures or a predetermined time period of the moving picture. With this arrangement, in the case of continuous shooting by which a plurality of still images is continuously shot or panorama shooting, large-capacity image data writing can be performed at high speed. The memory 410 may also be used as the work area of the system control circuit 440.

The compression/decompression circuit 411 compresses and decompresses image data using Adaptive Discrete Cosine Transform (ADCT) or the like. The compression/decompression circuit 411 reads the image data stored in the memory 410 to perform compression processing or decompression processing to thereby write the processed image data to the memory 410.

A shutter control circuit 420 controls a shutter 401 in conjunction with the diaphragm control section 455 that controls the diaphragm 452 of the imaging lens 100 based on light-metering information obtained from a light-metering section 422. An interface (hereinafter referred to simply as "I/F") section 423 electrically connects the camera body 200 and the imaging lens 100, and a connector 443 is provided in the camera body 200. An AF section 421 that performs AF processing evaluates a contrast component of image data obtained by the imaging element 201. The AF section 421 detects the focused state of the imaging lens 100 in accordance with well-known contrast system auto-focusing (AF) for performing the focus control of the imaging lens 100.

The light-metering section 422 for performing AE processing is also provided, and the light-metering results obtained thereby are transmitted to the system control circuit 440. Light flux transmitted through the imaging lens 100 is incident to the light-metering section 422 via a camera mount 442, the half mirror 202, and a light-metering lens (not shown) to measure the brightness of the subject, whereby exposure can be determined. Also, the light-metering section 422 has an EF processing function linked with a flash section 424. As in the AF section 421, the system control circuit 440 performs AE control on the shutter control circuit 420 and the diaphragm control section 455 of the imaging lens 100 based on the arithmetic results of image data of the imaging element 201 by the image processing circuit 413. The flash section 424 has a function of projecting AF auxiliary light and a function of controlling flash light.

The system control circuit 440 is configured by using an arithmetic processing unit such as a CPU or the like, and controls the camera body 200 overall in accordance with the interpretation and execution of the program. The memory 429 stores constants, variables, programs, and the like for the operation of the system control circuit 440. A display device 430 displays the operating states, messages, or the like with characters, images, and the like in accordance with the program execution by the system control circuit 440. The display device 430 is also provided with a speaker or the like. Information regarding the number of recorded discs, information regarding shooting conditions, information regarding the remaining power of the battery, date, and time, and the like are displayed on the display device disposed in the back of the case. Also, information such as focused state, hand-shake warning, flash charging state, shutter speed, diaphragm value, exposure correction, and the like is displayed on a display section provided within an optical viewfinder 445. An EEPROM or the like, which can electrically erase and record information, is employed for the nonvolatile memory 431.

The operation elements indicated by the reference numerals 433 to 437 are employed for inputting various kinds of operation instructions provided by the system control circuit 440, and are configured by a switch, dial, touch panel, pointing by sight-line detection, voice recognition device, and the like. A mode dial switch 433 is employed for the power-supply OFF operation and switching among various modes such as the shooting mode or the like. A shutter switch (hereinafter referred to as "SW1") 434 to be operated by a shutter button (not shown) is switched to the ON state when the shutter button is half-pressed, and is employed for providing instructions for starting operations such as AF processing, AE processing, AWB processing, EF processing, and the like. A shutter switch (hereinafter referred to as "SW2") 435 is switched to the ON state when the shutter button is fully pressed, and is employed for providing instructions for starting a series of processes regarding shooting such as exposure processing, development processing, storage processing, and the like. Exposure processing is a process in which a signal read out from the imaging element 201 is transmitted to the memory 410 via the A/D converter 412 and the memory control circuit 407 for writing image data. Development processing is arithmetic processing performed by the image processing circuit 413 and the memory control circuit 407. Storage processing is a process in which image data is read from the memory 410' to compress the image data by the compression/decompression circuit 411 to thereby write the image data onto the storage media 485 or 491.

An image display ON/OFF switch 436 is employed for the settings of the ON/OFF state of the image display section 405. When a photographer performs shooting while looking at the optical viewfinder 445, power saving can be achieved by shutting off the power supply to the image display section 405. A quick review ON/OFF switch 437 is employed for the settings of the ON/OFF state of the quick review function that allows automatic playback of the shot image data immediately after shooting. An operation section 438 includes various buttons, a touch panel, and the like. For example, by operating a face detection mode setting button, whether or not face detection using the face detection section 409 is carried out can be set.

A power supply control section 425 is configured by a battery detection circuit, a DC/DC converter, a switch circuit for switching a block to be electrified, and the like. The power supply control section 425 detects the presence/absence of the battery, the type of the battery, and the remaining power of the battery, and controls the DC/DC converter based on the detection result and instructions from the system control circuit 440 to thereby control the power supply to the respective sections. A power supply 428 connected via connectors 426 and 427 is a battery, an AC adaptor, or the like.

I/F sections 480 and 486, which transmit and receive data between a memory card and a storage medium such as a hard disk or the like, are connected to a storage medium via connectors 481 and 487, respectively. A storage medium attachment/detachment detection section 439 detects the mounting of a storage medium to thereby transmit the detection result to the system control circuit 440. Although two systems of interfaces and connectors to which the storage media are connected are provided in the present embodiment, one system or three or more systems of interfaces and connectors to which the recording media are connected may be provided. Alternatively, a combination (or combinations) of interfaces and connectors, which conform to different standards, may also be employed.

The optical viewfinder 445 is mainly configured by the focus plate 203, the pentaprism 204, and the eyepiece optical system 205 (see FIG. 1). Light flux transmitted through the imaging lens 100 is guided via the half mirror 202, so that a photographer can observe an optical image. A photographer can capture an image only using the optical viewfinder 445 without using an electronic view finder function provided by the image display section 405.

A communication section 432 has various communication functions including RS232C, USB, IEEE1394, P1284, SCSI, modem, LAN, wireless communication, and the like. The communication section 432 communicates with another device using a connector 446 for communication connection. The connector 446 serves as an antenna in the wireless communication. The connector 443 transmits a control signal, a state signal, a data signal, and the like between the camera body 200 and the imaging lens 100, and includes the function of supplying various voltages. Note that the communication section 432 may be configured such that electrical communication, optical communication, voice communication, and the like can be achieved via the connector 443.

The half mirror 202 reflects light transmitted through the imaging lens 100 toward the optical viewfinder 445 and guides light transmitted through the half mirror 202 to the imaging element 201. Also, a part of light transmitted through the half mirror 202 is guided to the AF section 421 via an AF submirror (not shown). While in the present embodiment, the half mirror 202 is fixed to the camera body 200 to serve as the entire half mirror due to its structural simplicity and lower cost, a quick-return mirror may also be employed.

A memory card, hard disk, or the like is employed for the storage media 485 and 491. The storage media 485 and 491 include recording sections 484 and 490 formed of a semiconductor memory, a magnetic disc or the like, I/F sections 483 and 489 with the camera body 200, and connector 482 and 488 for connection with the camera body 200, respectively.

Next, the imaging lens 100 will be described. The imaging lens 100 is mechanically coupled with the camera body 200 through a lens mount 458, and is interchangeably attached to the camera body 200 via the camera mount 442. The camera mount 442 and the lens mount 458 have various functions for electrically connecting the imaging lens 100 with the camera body 200. The lens section 101 includes a focus lens for performing focus adjustment, and light intensity adjustment is carried out by the diaphragm 452.

A connector 459 electrically connects the imaging lens 100 with the camera body 200. An I/F section 457 is connected with the I/F section 423 of the camera body 200 via the connectors 459 and 443. The connector 459 transmits a control signal, a state signal, a data signal, and the like between the camera body 200 and the imaging lens 100, and includes the function of supplying various voltages. Note that the communication section 432 may be configured such that electrical communication, optical communication, voice communication, and the like can be achieved via the connector 459.

A zoom control section 453 performs zooming control of the lens section 101, and the focus control section 454 performs driving control of the focus lens of the lens section 101. Note that when the imaging lens 100 is a single focus lens type with no zoom function, the zoom control section 453 becomes unnecessary. The diaphragm control section 455 controls the diaphragm 452 in conjunction with the shutter control circuit 420 based on light-metering information obtained from the light-metering section 422.

A lens system control circuit 456 controls the entire imaging lens 100, and includes a memory that stores constants, variables, programs, and the like for the operation of the imaging lens 100. The lens system control circuit 456 also includes a nonvolatile memory that stores identification information such as a unique number for each imaging lens, management information, open diaphragm value or minimum diaphragm value, function information such as focal distance, each setting value of the current and the past, and the like.

Figure 6:
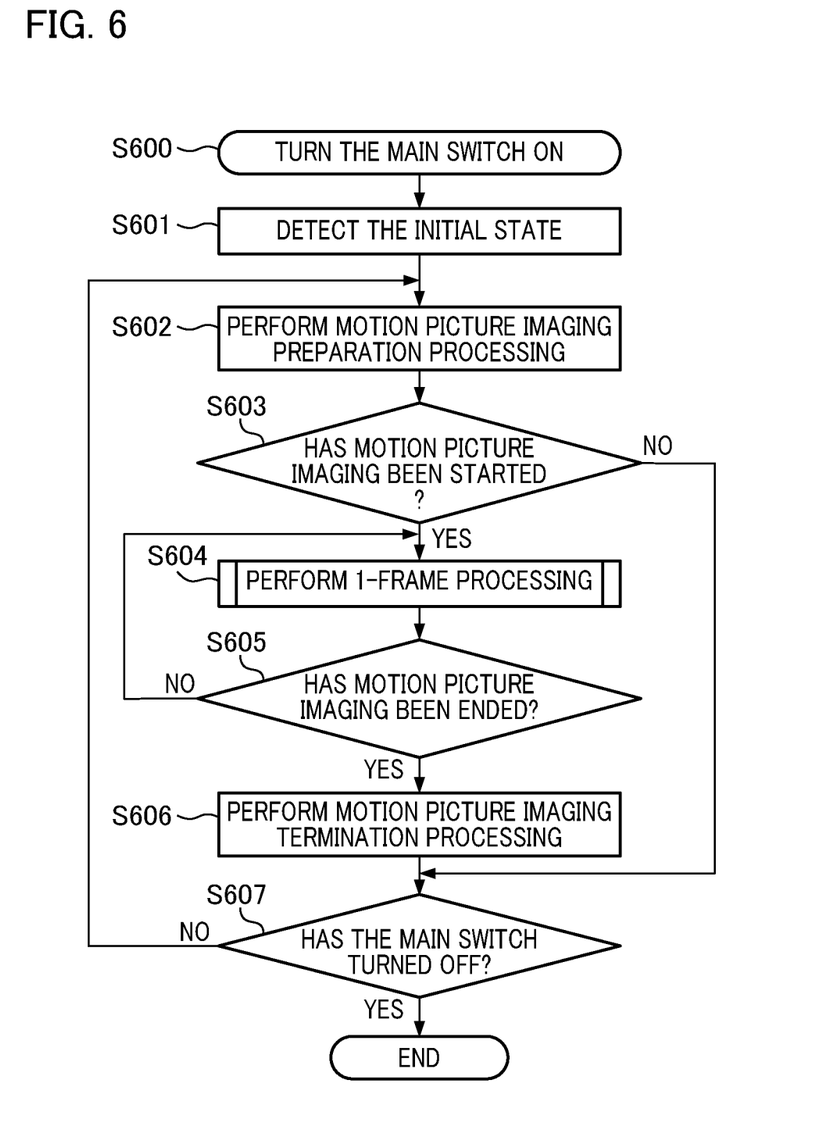
FIG. 6 is a flowchart illustrating an example of processing performed during motion picture imaging.
Figure 7:
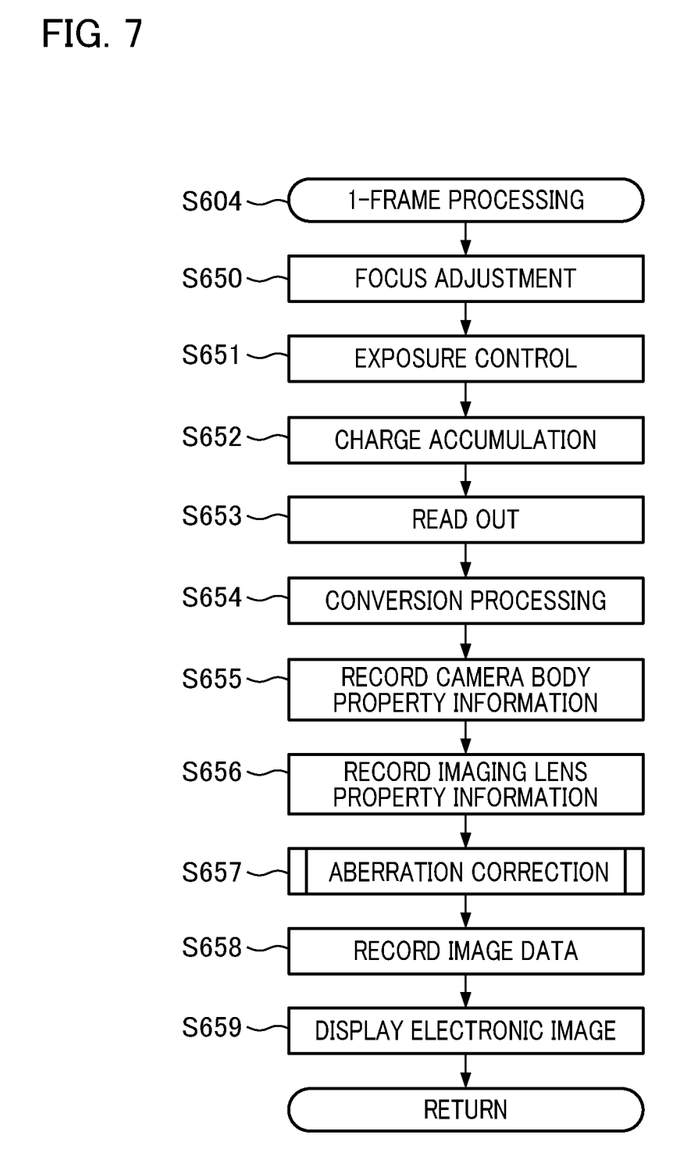
FIG. 7 is a flowchart illustrating an example of 1-frame processing in a motion picture imaging sequence.
Figure 8:
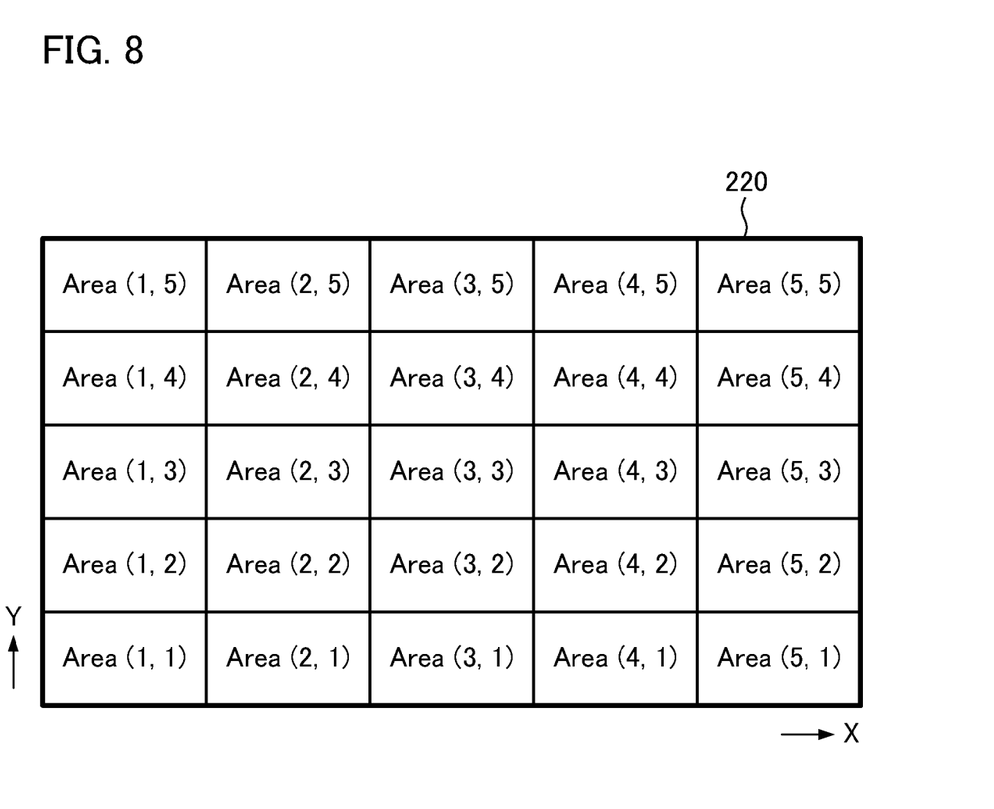
FIG. 8 is a diagram illustrating an exemplary division of a imaging range.

Each of FIGS. 6 to 10 (excluding FIG. 8) is a flowchart for illustrating the imaging operation. FIG. 8 is a diagram for illustrating aberration correction processing. FIG. 6 is a main flowchart, and shows the flow of processing in which the system control circuit 440 interprets a program for execution.

In step S600, a main power supply switch provided in the operation section 438 of the camera is switched to the ON state by the manual operation of a photographer, and then the process advances to step S601. Here, the system control circuit 440 performs an operation confirmation for the actuators within the camera body 200 and the imaging element 201, and initializes memory content and an execution program as well as executes shooting preparation processing. Next, in step S602, the system control circuit 440 executes motion picture imaging preparation processing. In motion picture imaging preparation processing, lens communication processing, shutter-open processing, preview-image display start processing, focus adjustment processing, exposure control processing, and the like are included. Lens communication processing is a process in which communication is performed with the lens system control circuit 456 within the imaging lens 100 via the connectors 443 and 459. With this arrangement, the operation confirmation of the imaging lens 100 is performed, whereby the memory content and execution program of the imaging lens 100 are initialized. Acquisition processing for acquiring data on various properties of the imaging lens 100 required for focus detection and imaging is carried out, and then the data is stored in the memory 429. In shutter-open processing, the system control circuit 440 drives the shutter 401 via the shutter control circuit 420 to keep the shutter 401 in an opened state. With this arrangement, open F-number imaging light flux transmitted through the imaging lens 100 reaches on the imaging element 201. In preview image display start processing, image data for preview, which has been written in the image display memory 408, is transmitted to the image display section 405 provided on the back side of the camera via the D/A converter 404 for image display. A photographer determines the composition of an image during imaging while viewing the image.

In focus adjustment processing, a focus lens is driven/controlled by the focus control section 454 to thereby perform focus adjustment. During what is referred to as "wobbling driving" in which the focus lens of the lens section 101 is reciprocally moved in the optical axis direction, an AF evaluation value is acquired. When the size of the variations in the AF evaluation value due to the reciprocating movement of the focus lens is within a predetermined amount, it is determined that the focus lens is in a focused state. On the other hand, when the size of the variations in the AF evaluation value is greater than a predetermined amount, it is determined that the focus lens is in an unfocused state, and the focus lens is moved in a direction toward the focused position by means of wobbling driving. Here, the AF evaluation value is a value indicating contrast information of image data. The absolute sum of differences between outputs over adjacent pixels of image data, or the like may often be employed.

In exposure control processing, the exposure condition is set based on the pixel output value obtained from the imaging element 201, a setting value is determined by a combination of the sensitivity of the imaging element 201, the accumulation time of the imaging element 201, and the F number of the imaging lens 100. The imaging element 201 performs photoelectric conversion processing for the subject image produced by imaging light flux of a predetermined F number with a predetermined sensitivity and a predetermined accumulation time.

In step S603, the system control circuit 440 determines whether or not a start operation of motion picture imaging has been carried out by the operation section 438. When the start operation of motion picture imaging is not carried out, the process advances to step S607, whereas when the start operation of motion picture imaging has been carried out, the process advances to step S604. Here, a 1-frame processing subroutine is executed to carry out a shooting operation of 1-frame during motion picture imaging, the details of which will be described with reference to FIG. 7.

Next, in step S605, the system control circuit 440 determines whether or not a terminating operation of motion picture imaging has been carried out by the operation section 438. When the terminating operation of motion picture imaging has not been carried out, the process returns to step S604 so as to continue motion picture imaging. On the other hand, when the terminating operation of motion picture imaging has been carried out, the process advances to step S606, and the system control circuit 440 performs processing for terminating motion picture imaging. The processing includes preview image display end processing, shutter closing processing, and lens communication processing. In preview image display end processing, the image data display for a preview is ended. In shutter closing processing, the shutter control circuit 420 closes the shutter 401, whereby imaging light flux transmitted through the imaging lens 100 does not reach the imaging element 201. In lens communication processing, the system control circuit 440 communicates with the lens system control circuit 456 within the imaging lens 100 via the connectors 443 and 459 to provide instructions about terminating motion picture imaging to the imaging lens 100 to thereby cause the imaging lens 100 to transfer to a motion picture imaging preparation state.

In step S607, the system control circuit 440 determines whether or not the off-operation of the main power supply switch has been carried out. When the off-operation has not been carried out, the process returns to step S602. When the off-operation has been carried out, the series of operations is ended.

FIG. 7 is a flowchart illustrating an example of a 1-frame processing subroutine. The control of the subroutine is performed by the system control circuit 440. When the processing in step S604 is executed in the main routine shown in FIG. 6, the present subroutine is invoked. In step S650, focus adjustment processing is performed such that the focus state of the imaging lens 100 is in-focus.

In step S651, exposure control processing is performed based on the pixel output value obtained from the imaging element 201. In step S652, the charge accumulation of the imaging element 201 is performed based on the accumulation time that has been set by exposure control processing in step S651. In step S653, image data is read out. Since the readout of image data must be performed at high speed frame rate such as 30 frames per second or 60 frames per second during motion picture imaging, the number of pixels is limited. Hence, during the readout of image data, a pixel-skipping readout or an augmented readout is performed such that the number of pixels falls within the number capable of being read out at a frame rate for moving picture.

In step S654, the image processing circuit 413 performs image processing such as γ correction, color conversion, edge emphasis, and the like of an image. In step S655, the property information of the camera body 200 is stored in the memory 429 in association with image data to be recorded in step S658, which is to be described below. Here, the property information of the camera body 200 is, for example, as follows.

Information regarding the position and the thickness of the half mirror 202.

Information regarding the refractive index and the Abbe number of the half mirror 202.

Information regarding the light-receiving sensitivity distribution of the imaging element 201.

Information regarding vignetting of imaging light flux within the camera body 200.

Information regarding the distance between the mounting surface between the camera body 200 and the imaging lens 100 and the imaging element 201.

Information regarding production error, and the like.

Since light-receiving sensitivity distribution information regarding imaging pixels of the imaging element 201 is determined by an on-chip micro lens and a photoelectric conversion section, such information may be stored in the memory 429.

In step S656, the property information of the imaging lens 100 is stored in the memory 429 in correspondence with image data to be recorded in step S658. Here, the property information of the imaging lens 100 includes exit pupil information, frame information, information regarding the F number during imaging, aberration information, production error information, and the like.

In step S657, an aberration correction subroutine is invoked for execution. The image processing circuit 413 performs correction processing for aberration caused by the half mirror 202 that is disposed in the imaging optical path at an inclination angle of 45 degrees with respect to the optical axis L. The image processing circuit 413 estimates the transfer function of the image data degraded by the aberration resulting from the half mirror 202 based on imaging lens property information and camera body property information, and aberration correction processing is performed through its inverse conversion, the details of which will be described below with reference to FIGS. 8 and 9.

The process advances to step S658, and the image data subjected to aberration correction by the image processing circuit 413 is sequentially recorded on the storage medium 485 or 491. Specifically, as a result of aberration correction processing performed by the image processing circuit 413, the image data to be recorded on the storage medium 485 or 491 is an image for which aberration has been corrected.

In step S659, the recorded image data is transmitted to the image display section 405 provided on the back side of the camera for image display. A photographer can determine the composition or the like of an image during imaging while viewing the image, and confirm the appearance of recorded image. After completing step S659, the process returns to the main routine shown in FIG. 6.

FIG. 8 is a diagram illustrating how transfer function generation/correction processing is sequentially performed with respect to the divided imaging range in the aberration correction subroutine of step S657. In the imaging range 220 of the imaging element 201, Area (m, n) (m=1 to 5, n=1 to 5) has 25 (5 times 5) divided areas/divisions. The left-bottom area is Area (1, 1), the one area to the right in the +X direction is Area (2, 1), and the one area above in the +Y direction is Area (1, 2). In this manner, accompanying each advance to the right (+X direction), the value of m increases by one, whereas accompanying each advance in the upper direction (+Y direction), the value of n increases by one. The center area is Area (3, 3), and the right-upper area is Area (5, 5).

Aberration caused by the half mirror 202 that is disposed in the imaging optical path at an inclination angle of 45 degrees with respect to the optical axis L differs depending on the X and Y directional positions of image data. Hence, in the present embodiment, as shown in FIG. 8, the imaging range 220 is divided into 25 (5 times 5) areas/divisions, and a transfer function is defined for each area to thereby perform aberration correction based on the transfer function. The transfer function defined herein has a symmetry in the X direction (the left-right direction in FIG. 8) and an asymmetry in the Y direction (the vertical direction in FIG. 8).

Among the divided areas/divisions, i.e., Area (1, 1) to Area (5, 5), first, the definition of the transfer function and aberration correction are performed for Area (1, 1). Next, the area of interest is moved to one right (+X direction), and the definition of the transfer function and aberration correction are performed for Area (2, 1). When the area of interest reaches the right end area, i.e., Area (5, 1) shown in FIG. 8, the area of interest is moved to one row up to the left end area, i.e., Area (1, 2), and the definition of the transfer function and aberration correction are performed therefor. In this manner, aberration correction processing is performed such that the area is changed one-by-one so as to scan it in the X and Y direction. Thus, aberration correction processing is ultimately completed for the entire area of the imaging range 220.

The distribution of aberration to be corrected in the aberration correction subroutine to be described below has a symmetry in the left-right direction shown in FIG. 8. Hence, for the transfer function defined for each divided area/division, a value inverted from left to right may be employed for a transfer function value at the position symmetrical to the left-right direction. For example, in the case of Area (1, 5) and Area (5, 5), a function in which the transfer functional form according to Area (1, 5) is inverted from left to right may be applied to Area (5, 5). Thereby, the number of data is reduced by half for the transfer function defined for each area, which is effective in reducing the amount of memory used. While the present embodiment has been described with the 25 divisions of the imaging range 220 in consideration of processing speed, a more elaborate division may be performed for aberration correction with high accuracy.

Figure 9:
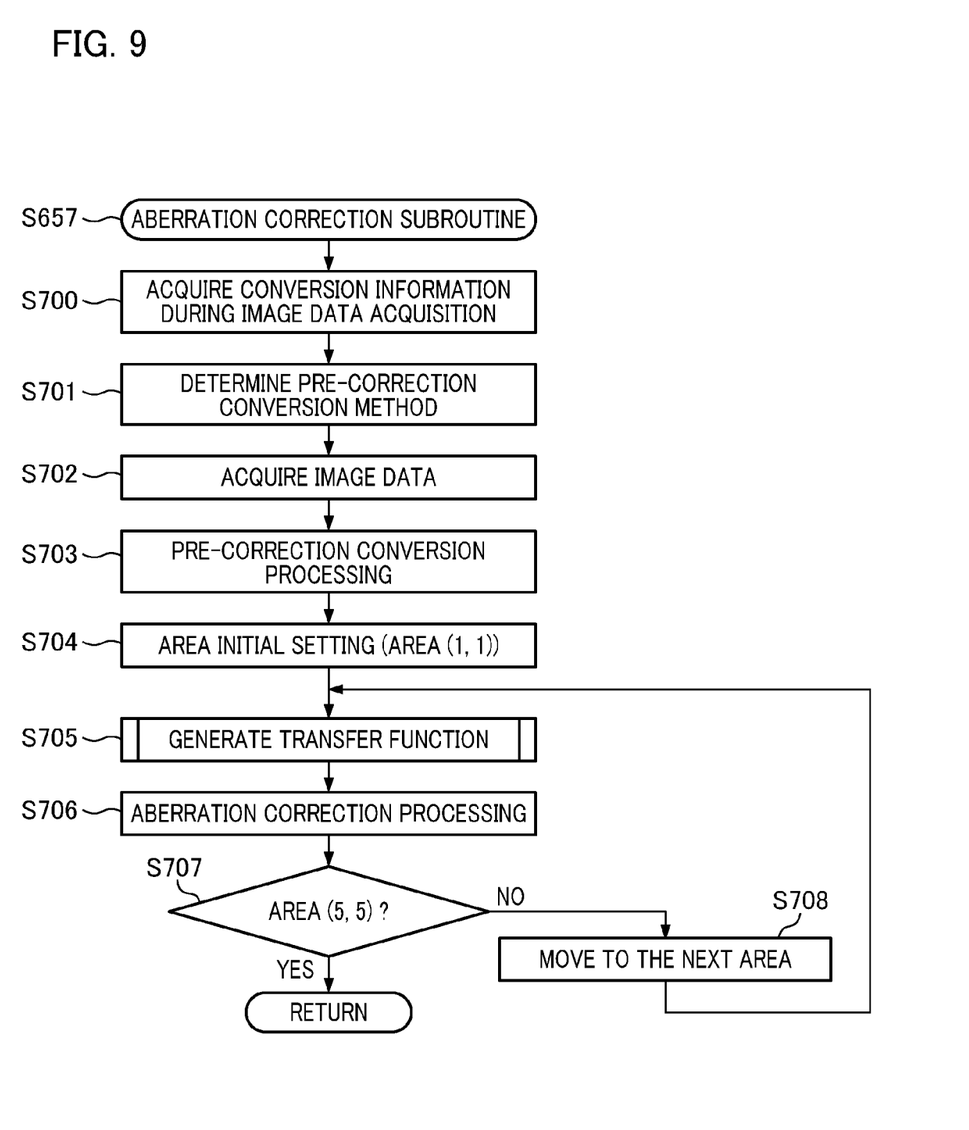
FIG. 9 is a flowchart illustrating an example of processing of an aberration correction subroutine in the motion picture imaging sequence.

FIG. 9 is a flowchart illustrating an example of processing in accordance with an aberration correction subroutine. A series of operations are performed by the image processing circuit 413.

First, in step S700, acquisition processing for acquiring the conversion information indicating the conversion processing contents obtained in step S654 shown in FIG. 7 is performed during image data acquisition.

In step S701, the image processing circuit 413 determines a conversion method to be carried out on image data prior to correction processing. In order to ensure linearity that is a prerequisite for the image restoration processing algorithm, a conversion method for converting image data needs to be determined such that the exposure value and the pixel value are in a proportional relationship. For example, when the image processing circuit 413 executes gamma correction in the conversion process of step S654 during image data acquisition, inverse conversion with respect to the conversion during gamma correction is set in step S701. Thereby, image data prior to conversion can be reproduced, whereby image data having linearity can be acquired. Likewise, when the image processing circuit 413 executes color correction in the conversion process of step S654 during image data acquisition, inverse conversion of the conversion during color conversion is set in step S701. Thereby, image data having linearity can be acquired. As described above, in step S701, a conversion method corresponding to the inverse conversion of conversion processing to be performed by the image processing circuit 413 in the conversion process of step S654 is determined. The present embodiment assumes that aberration correction is performed for image data subjected to conversion processing in which linearity is not ensured, conversion prior to aberration correction is performed. However, when image data that maintains linearity can be acquired, aberration correction can be performed directly without performing conversion prior to correction described above.

Next, in step S702, image data is acquired. In step S703, the conversion processing of the acquired image data is carried out in accordance with the conversion method determined in step S701. Then, in step S704, the image processing circuit 413 sets the area of interest for aberration correction to the initial area, i.e., Area (1, 1).

In step S705, a subroutine for generating a transfer function is invoked for execution, and the transfer function for the area of interest is generated. Here, the transfer function is generated for each of the colors red, green, and blue (RGB). Also, the generated transfer function has an asymmetry in the vertical direction shown in FIG. 8 as described in FIGS. 2 to 4.

In step S706, aberration correction processing is performed for image data that was subjected to conversion processing in step S703 based on the transfer function generated in step S705, as is described in the above formula (4), and image data prior to deterioration caused by the aberration may be obtained. Since the transfer function is different for each of the colors RGB, aberration correction is performed by the inverse-conversion processing of the transfer function for each RGB signal. Specifically, the aberration-corrected image data, of which the aberration has been corrected, may be obtained by the image restoration process described in the above formula (4). A method for restoring an image using the inverse-conversion processing of the transfer function is disclosed in Japanese Patent Laid-Open No. 2000-20691 and the like, and no further description will be given here.

In step S707, it is determined whether or not the area of interest for aberration correction has reached Area (5, 5). When it is determined that the area of interest has reached Area (5, 5), aberration correction for the entire area of the imaging range 220 is completed, the aberration correction subroutine shown in step S657 in FIG. 7 is ended, and thereby the process proceeds to step S658. On the other hand, when it is determined that the area of interest has not reached Area (5, 5), the process advances to step S708, and the area of interest for aberration correction is set to the next area. Specifically, when the area of interest is moved to one to the right (+X direction) in FIG. 8 to thereby reach the right end, the process in which the area of interest is moved up one row to the left end is performed, and the process returns to step S705 to thereby continue the generation and aberration correction of the transfer function for the new area of interest.

Figure 10:
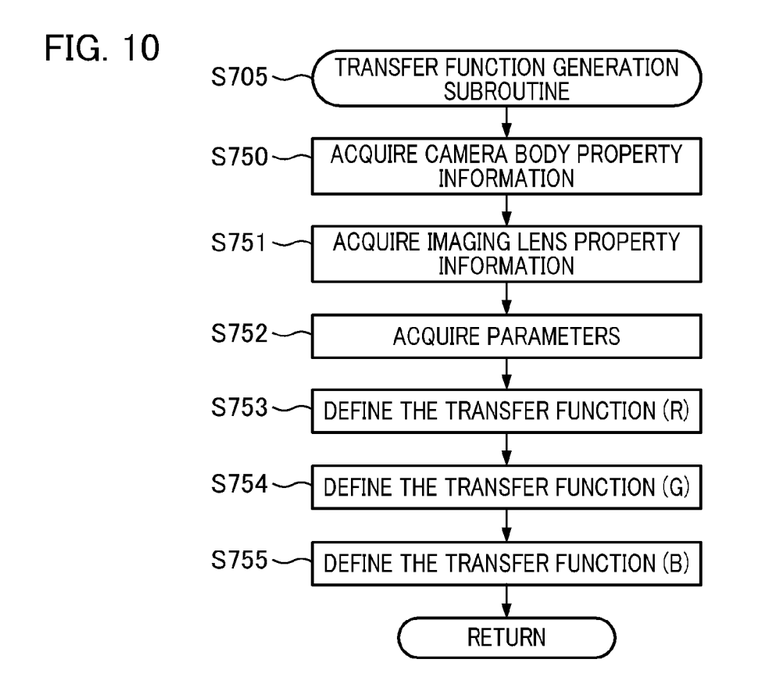
FIG. 10 is a flowchart illustrating an example of processing according to a transfer function generation subroutine in the motion picture imaging sequence.

FIG. 10 is a flowchart illustrating an example of processing according to a transfer function generation subroutine. The system control circuit 440 performs a series of operations in accordance with the present subroutine for generating the transfer functions for the 25 divisions, i.e., "Area (m, n)" (m=1 to 5, n=1 to 5), constituting the imaging range 220 shown in FIG. 8.

First, in step S750, a process for acquiring the property information of the camera body 200, which has been stored in the memory 429 in step S655 shown in FIG. 7, is performed. Next, in step S751, a process for acquiring the property information of the imaging lens 100, which has been stored in the memory 429 in step S656 shown in FIG. 7, is performed.

In step S752, the parameters for use in defining the transfer function are acquired. The transfer function is determined by the optical transfer characteristics between the imaging lens 100 and the imaging element 201. In addition, the optical transfer characteristics may differ for each of the colors RGB, and may be varied depending on factors such as the property information of the camera body 200, the property information of the imaging lens 100, the X and Y directional positions of image data, the subject distance, and the like. The nonvolatile memory 431 stores table data associating these factors with the parameters for use in defining the transfer function in advance. The system control circuit 440 acquires information for parameters that are used when defining the transfer function for each of the colors RGB based on these factors, from the nonvolatile memory 431.

In step S753, the system control circuit 440 defines the transfer function for an R signal based on the parameters that have been acquired in step S752. The transfer function represents the optical transfer function characteristics for the R wavelength until the R signal reaches the imaging element 201 from the imaging lens 100. In step S754, the system control circuit 440 defines the transfer function for a G signal based on the parameters that have been acquired in step S752. The transfer function represents the optical transfer function characteristics for the G wavelength until the G signal reaches the imaging element 201 from the imaging lens 100. In step S755, the system control circuit 440 defines the transfer function for a B signal based on the parameters that have been acquired in step S752. The transfer function represents the optical transfer function characteristics for the B wavelength until the B signal reaches the imaging element 201 from the imaging lens 100.

After completing step S755, the transfer function generation subroutine is ended to return to the aberration correction subroutine shown in FIG. 9, and the process proceeds to aberration correction in step S706.

As described above, according to the first embodiment, a mechanism for moving the half mirror becomes unnecessary, whereby a single-lens reflex digital camera that is provided with an optical viewfinder and is capable of motion picture imaging can be realized that has a small size and a low cost. Since an aberration generated by the half mirror is corrected by image processing, high quality motion picture imaging can be performed. While in the present embodiment, a description has been provided using an example of a camera provided with an interchangeable imaging lens, the present invention is not limited thereto, but may be applied to a camera provided with an imaging lens, i.e., a lens-fixed/fixed-lens type camera.

Because the aforementioned problems still exist this type of camera as well, the same effect can be obtained by utilizing the structure described above.

Second Embodiment

Figure 11:
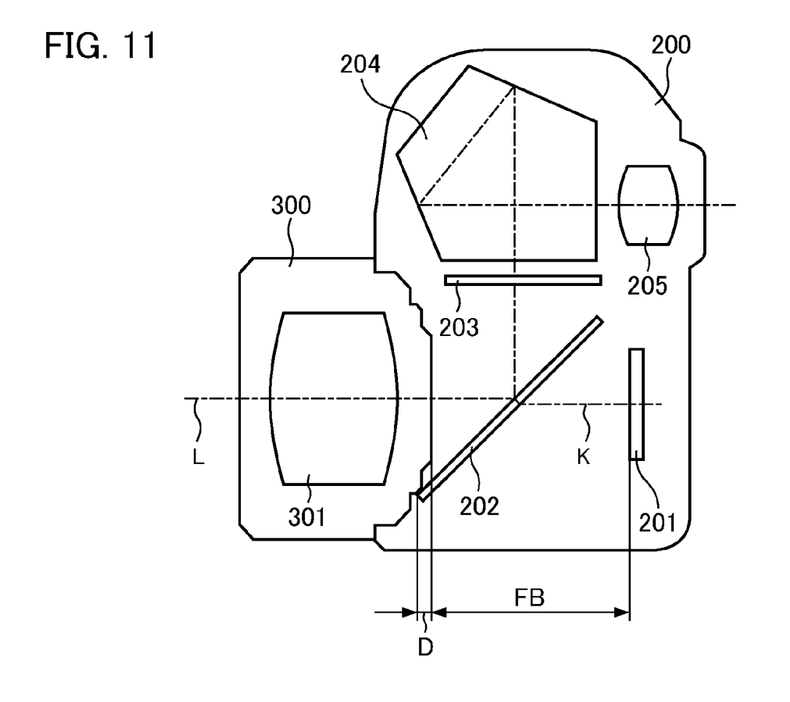
FIG. 11 is a schematic diagram illustrating the central section of a single-lens reflex camera according to the second embodiment of the present invention.

Next, an imaging apparatus on which a short flange back imaging lens is mounted will now be described according to a second embodiment of the present invention. FIG. 11 is a schematic diagram illustrating the central section of the optical system of the a single-lens reflex camera. Note that the constituent elements of the camera body 200 excluding an imaging lens 300 and a lens section 301 shown in FIG. 11 are denoted by the same reference numerals as those of the corresponding constituent elements shown in FIG. 1, and the explanation thereof will be omitted. The following explanation will be focused on differences with the first embodiment.

The imaging lens 300 is interchangeably mounted on the camera body 200, and the lens section 301 of the imaging lens 300 includes a focus lens group or a zoom lens group. The symbol "L" represents the optical axis of the imaging lens 300, and the symbol "FB" represents the distance between the rear end of the imaging lens 300 and the imaging element 201 (referred to as a "flange back"). FB is shorter when compared to that in FIG. 1. It can be seen that the rear end portion of the imaging lens 300 and the leading end portion of the half mirror 202 are mutually overlapped by the amount D illustrated in FIG. 11 in a direction parallel to the optical axis L. Specifically, with the imaging lens 300 side oriented toward the front, the symbol "D" represents the distance difference between the front end portion of the half mirror 202 and the rear end portion of the imaging lens 300 in a direction parallel to the optical axis L. The rear end portion of the imaging lens 300 mounted on the camera body 200 comes to the position placed further back than the one end portion (front end portion) of the inclined half mirror 202, and is partially overlapped with the half mirror 202 when viewed from a direction perpendicular to the optical axis. Unlike the conventional single-lens reflex camera, the half mirror 202 provided in the camera body 200 does not move but is fixed, whereby the imaging lens 300 can be arranged closer to the back of the camera body.

According to the second embodiment, the entire size, including the imaging lens 300 and the camera body 200, can be reduced to a compact configuration.

Third Embodiment

Figure 12:
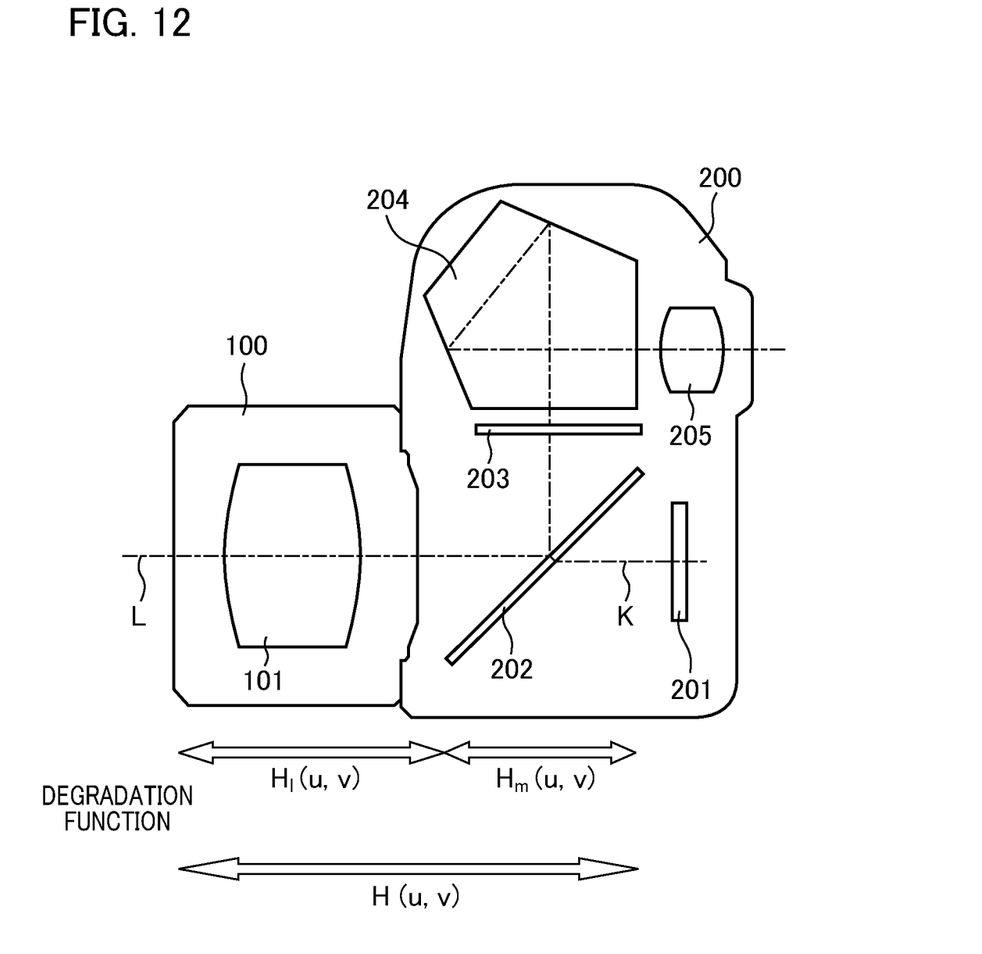
FIG. 12 is a diagram illustrating the allocation of a degradation function according to a third embodiment of the present invention.

Next, a third embodiment of the present invention will now be described. The third embodiment shows an example in which the procedure of aberration correction processing described in the first embodiment is partially changed. FIG. 12 is a diagram illustrating the allocation of a degradation function according to the third embodiment. The configuration of the imaging lens 100 and the camera body 200 is the same as that shown in FIG. 1. In the first embodiment, for aberrations caused by the imaging lens 100 and the half mirror 202, respectively, aberration correction is executed by using the integrated transfer function H (u, v). In contrast, in third embodiment, aberration can be independently corrected by using the transfer function $H_l$ (u, v) for the imaging lens 100 and the transfer function $H_m$ (u, v) for the half mirror 202, respectively. The following explanation will be given emphasizing the differences with the first embodiment.

The light quantity distribution $I_l$ (u, v) of a degraded image caused by the imaging lens 100 may be represented by the following formula (5).

[Formula]5

$$I_l(u,v)=O(u,v)\cdot H_l(u,v) \quad (5)$$

Here, the function $H_l$ (u, v) is a transfer function representing how an image is degraded by the imaging lens 100.

Next, the light quantity distribution $I_m$ (u, v) of a degraded image caused by the transmission through the half mirror 202 may be represented by the following formula (6).

[Formula 6]

$$I_m(u,v)=I_l(u,v)\cdot H_m(u,v) \quad (6)$$

Here, the function $H_m$ (u, v) is a transfer function representing how an image is degraded by the half mirror 202.

When formula (5) is substituted for formula (6), the light quantity distribution in consideration of the degradation caused by both the imaging lens 100 and the half mirror 202 may be represented by the following formula (7).

[Formula 7]

$$I_m(u,v)=O(u,v)\cdot H_l(u,v)\cdot H_m(u,v) \quad (7)$$

By transforming the above formula (7), the function prior to deterioration O (u, v) may be represented by the following formula (8).

[Formula 8]

$$O(u,v) = I_m(u, v)\cdot \frac{1}{H_l(u, v)\cdot H_m(u, v)} \quad (8)$$

The function $H_m$ (u, v) in the above formula is a function that is unique for the camera body 200. On the other hand, the function $H_l$ (u, v) is a function that is determined by the imaging lens 100. Hence, for an interchangeable lens system, the function $H_l$ (u, v) varies every time the interchangeable lens for the camera body 200 is replaced or the state thereof is changed. Accordingly, the system control circuit 440 reads out data of the inverse filter "$1/H_m$ (u, v)", which is stored in the nonvolatile memory 431 or the like in advance. Also, the system control circuit 440 reads out data of the inverse filter "$1/H_l$ (u, v)" from the imaging lens 100 via the I/F sections 457 and 423 shown in FIG. 5. With this arrangement, the entire aberration can be corrected based on the product of both data.

According to the third embodiment, in an interchangeable lens system, the degradation function is changed depending on the interchangeable lens so as to perform an image restoration process using an inverse filter compatible with the lens, whereby a high quality moving picture can be obtained.

What is claimed is:
1. An imaging apparatus comprising:
an optical element that is obliquely disposed relative to the optical axis of an imaging lens in order to reflect and transmit a part of the light transmitted through the imaging lens;
an optical viewfinder that is capable of observing a subject with light reflected from the optical element;
an imaging element that receives light transmitted through the optical element to output image data; and
an image processing unit configured to correct aberration, which occurs due to the transmittance of light through the optical element, of the image data obtained by the imaging element, by conversion processing based on a transfer function according to the optical element and restore image prior to the occurrence of aberration, wherein the image processing unit corrects aberration having a symmetry in a first axial direction based on a transfer function according to the optical element, and aberration having an asymmetry in a axial second direction that is perpendicular to the first axial direction and an optical axis of the optical element and is a travelling direction of the light reflected by the optical element based on the transfer function according to the optical element, wherein a value inverted from left to right is employed for a transfer function value at a position symmetrical to the first axial direction.

2. The imaging apparatus according to claim 1, wherein the optical element is fixedly disposed between the imaging lens and the imaging element.

3. The imaging apparatus according to claim 1, wherein the imaging lens is removably attached to the imaging apparatus, a part of the imaging lens is positioned closer to the imaging element side than one end portion of the optical element with the imaging lens mounted on the imaging apparatus, and the imaging lens and the optical element are partially overlapped when viewed from a direction perpendicular to the optical axis.

4. The imaging apparatus according to claim 1, wherein the image processing unit corrects aberration, which occurs by the transmittance of light through the imaging lens and the optical element, of the image data obtained by the imaging element, by conversion processing based on a transfer function according to the imaging lens and the optical element, and restores the image.

5. The imaging apparatus according to claim 4, wherein the image processing unit changes its transfer function depending on the imaging lens mounted on the imaging apparatus to correct the aberration.

6. A method for controlling an imaging apparatus, in which a part of the light transmitted through an imaging lens is reflected from an optical element to reach an optical viewfinder, and light transmitted through the optical element is received by an imaging element to output image data, the method comprising the steps of:

acquiring property information of an imaging apparatus including the optical element;

defining a transfer function according to the optical element that is obliquely disposed relative to the optical axis of an imaging lens based on the property information; and correcting aberration, which occurs due to the transmittance of light through the optical element, of the image data obtained by the imaging element, by conversion processing based on the transfer function, and restoring/recovering image prior to the occurrence of aberration, wherein in the correcting step, aberration having a symmetry in a first axial direction is corrected based on a transfer function according to the optical element, and aberration having an asymmetry in a second axial direction that is perpendicular to the first axial direction and an optical axis of the optical element and an optical axis of the optical element and is a travelling direction of the light reflected by the optical element is corrected based on the transfer function according to the optical element, wherein a value inverted from left to right is employed for a transfer function value at a position symmetrical to the first axial direction.

* * * * *